UNITED STATES PATENT OFFICE.

JOHN J. CROOKE, OF NEW YORK, N. Y.

PROCESS OF MAKING TIN-FOIL.

SPECIFICATION forming part of Letters Patent No. 315,009, dated April 7, 1885.

Application filed February 14, 1885. (No specimens.)

*To all whom it may concern:*

Be it known that I, JOHN J. CROOKE, a citizen of the United States, residing in the city of New York, county of New York, and State of New York, have invented a new and useful Improvement in the Manufacture of Tin-Foil; and I declare that the following is a full, clear, and exact description and specification of the said improvement.

Formerly tin-foil was made by applying a single sheet of pure tin to one or both sides of a single sheet of lead and welding the whole together by passing the sheets so arranged between the rolls of an ordinary flatting-mill set to exert a certain pressure; but it is a fact that foils made by this method are imperfect, even when a large quantity of tin is used for the surface covering. The difference in hardness and malleability between lead and tin causes the tin during lamination to be driven into the surface of the lead in deep longitudinal furrows, producing corresponding irregular parallel ridges, and as the foil in process of rolling becomes attenuated the tin covering the apex of these ridges invariably ruptures, thus exposing lead upon the surface and producing the condition technically known as "lead streaks." In order to remedy this defect, manufacturers have resorted to various devices, particularly to hardening of the lead core; but, unfortunately, where the tin is applied in a single sheet the core must be approximately, if not equally, hardened, so that the two sheets shall evenly reduce in the rolling process, as otherwise the harder tin will embed into the lead, and if under these circumstances any other metal besides tin is used to harden the core, or an alloy in which tin must largely predominate, the lead becomes brittle, and hence foil so made will be brittle, lack strength, and readily break. Therefore, to harden the core properly—that is, with a material that will promote its ductility and toughness—would so greatly advance the cost of the foil as to render its general use impossible. It is owing to this fact that so-called "tin-foils" are daily placed upon the market bearing upon their surfaces streaks and blotches of oxidizable lead.

To remedy this defect was the object of the invention of the process and manufacture of what is known as the "compound tin-foil," described in Patent No. 195,490, granted to me September 25, 1877. That invention was based upon the discovery that the warmth produced in the act of rolling would cause a hard alloy of lead and tin to work practically like commercially pure tin. Taking advantage of this fact, my method of manufacture was to roll an ingot of alloy composed of lead and tin to the requisite thinness. Upon this I placed a sheet of pure tin, which was welded to the alloy by passing the same through the rolls under proper pressure. This compound sheet was milled down to about thirteen-wire gage. I then rolled an ingot of lead down to about three-eighths of an inch in thickness. Upon this I doubled lengthwise the tin-plated alloy, and passed the stratified sheets (each retaining its proper position) through the mill, set to a pressure that would weld the sheets into one compound slab. This compound slab was then reduced by successive passages through the rolls to foil. By this process of manufacture I obtained a more even distribution of the tin upon the exposed face of the foil, the intercolated hard alloy of lead and tin preventing in a great measure any disturbance of the tin from a plane surface on the side in contact with the alloy. This method for the manufacture of compound foils I have practiced for a number of years, and although vastly superior to the old process I have been long aware that it did not fully answer all the requirements of a perfect art.

The enormous amount of pressure required to weld thick pieces of stock by milling down has been heretofore a fatal impediment to the absolutely even surface distribution of the tin. Independent of the lead streaks on the surface of commercial foil, it will be found, upon a partial denudation of the surface, that the tin in many places is a mere film, and in other places is from three to four times the necessary thickness to answer all the requirements of a perfect tin covering. To correct this uneven distribution of the tin, to secure a solid unbroken surface, and to produce a foil at a minimum cost that shall possess all the requisites of a pure tin-foil, is the object of my invention.

In order that my improvement may be fully understood, I will proceed to describe the various steps of the process.

The first step is to prepare the base or core. For this purpose I take an ingot of commercial lead, or, by preference, one slightly hardened with antimony or tin, say in the proportions of one-half of one per cent. of hardening material. I cast this ingot in dimensions about as follows: eighteen inches long, seven-eighths of an inch thick, and of any width required. I then place upon both sides of this slab-like base or core a sheet of tin that will entirely cover its surfaces. This sheet of tin has been rolled to about thirty-five gage, and is consequently quite thin. I then pass the slab carrying the sheet of tin upon its surfaces through the rolls, welding the tin to the base or core by the pressure of one passage. The ingot will now be about two feet in length. I then place upon it another sheet of tin of the same gage, of a size sufficient to cover both surfaces, which have previously been plated with one sheet of tin welded to the core. I then weld this second sheet of tin upon the sheet of tin already welded to the core by passing the compound slab a second time through the rolls. This process of building up sheet upon sheet I continue until I have placed a sufficient amount of tin upon each side of the slab of lead (pure or hardened) that will insure solid unbroken surfaces of pure tin when the stock is rolled down. The rolling of this laminated slab is continued until it is brought to the condition of foil.

In the foregoing description I have contemplated applying each covering of tin to the base or plated base by using in each application a sheet long enough to be lapped around the slab, and thus cover both its surfaces; but it is obvious that a separate sheet of tin applied to each surface will be the same.

In practice I find that, when the tin-plating is applied to the base or core in the condition of thin sheets, the welding-pressure required is very much less, and in building up the plating by the successive addition of such thin sheets an absolutely even distribution of the tin upon the surface of the underlying base metal is thereby obtained. In the manufacture of tin-plated foils it is of the greatest importance that the surface of such foils should carry a perfect covering of pure tin. With my new method of plating for the manufacture of foil I find that a certain weight of tin will produce a solid unbroken surface of pure tin, while the old method of plating with the same amount of tin welded at one operation will produce a broken leaden-streaked and oxidizable surface. This regular and irregular distribution of the tin, as illustrated by the two methods, is caused by the difference in pressure required to weld a thin or a thick sheet to the thick slab of base metal; or, in other words, a longitudinal axial line will stand nearer to the upper and under nipping-surfaces of the rolls, thus bringing the lines of motion and power near enough to equalize the molecular movement of the metals.

In rolling a thick or a thin slab of metal there is a noticeable difference between the two in the movement and arrangement of their particles, especially in their lateral arrangement and movement. This difference is caused by the greater or lesser distance maintained between their exterior or rolling contact surfaces and their interior or contact surfaces by transmission. Hence the thinner the slab the more controllable are the results for which the power is applied. In the present case examination will show that the tin welded to the alloy has maintained an absolutely plane and smooth surface at the point of welding-contact.

In practice I find that however small the quantity of tin taken the plating with my process will be found absolutely even; and if the proper amount of tin is applied, (which need not be as much as is now used in the manufacture of my compound foil,) the result will be a foil carrying a solid pure tin surface possessing all the sanitary qualities of a foil composed throughout of entirely pure tin. It is, however, to be observed that when the thin plating-sheets of tin are applied directly to the core or base of lead a greater number of such sheets of tin will be required than in the case where such thin plating-sheets of tin are applied upon a base or core that has been slightly hardened, as before explained. In either case, however, the advantageous result of an even distribution of the tin is accomplished and the perfect covering of the leaden base or core is obtained, the product differing slightly in cost, according to the number of sheets and consequent amount of tin used.

Of course the tin sheets may be applied to one surface only of the leaden base or core; but where the base is but slightly alloyed the product when plated upon one side would only be suitable for limited use.

What is claimed is—

The improved process of manufacturing tin-foil, the same consisting in facing a leaden base or core with a plating or covering consisting of sheets of tin built up and welded together by successive applications and rolling, substantially as described.

In testimony whereof I have hereunto set my hand in the presence of two subscribing witnesses.

JOHN J. CROOKE.

In presence of—
 T. H. PALMER,
 A. N. JASBERA.